US006940833B2

(12) United States Patent
Jonas et al.

(10) Patent No.: US 6,940,833 B2
(45) Date of Patent: Sep. 6, 2005

(54) TWO-DIMENSIONAL SCHEDULING SCHEME FOR A BROADBAND WIRELESS ACCESS SYSTEM

(75) Inventors: Amnon Jonas, Jerusalem (IL); Menashe Shahar, Ramat-Gan (IL)

(73) Assignee: Vyyo Ltd., Cupertino, CA (US)

( * ) Notice: Subject to any disclaimer, the term of this patent is extended or adjusted under 35 U.S.C. 154(b) by 844 days.

(21) Appl. No.: 09/771,162

(22) Filed: Jan. 26, 2001

(65) Prior Publication Data

US 2002/0036985 A1 Mar. 28, 2002

Related U.S. Application Data

(60) Provisional application No. 60/187,568, filed on Mar. 7, 2000, and provisional application No. 60/178,138, filed on Jan. 26, 2000.

(51) Int. Cl.[7] .............................................. H04B 7/212
(52) U.S. Cl. ....................... 370/329; 370/442; 725/111
(58) Field of Search ................................ 370/296, 329, 370/343, 345, 346, 347, 348, 352, 354, 364, 412, 442–444, 449, 486–490, 503, 516, 305–308; 725/95, 97, 111–112, 118, 127, 132, 148; 340/504, 505

(56) References Cited

U.S. PATENT DOCUMENTS

| | | | |
|---|---|---|---|
| 4,933,846 A | * | 6/1990 | Humphrey et al. ......... 710/107 |
| 5,809,406 A | | 9/1998 | Taki et al. |
| 5,809,427 A | | 9/1998 | Perreault et al. |
| 5,818,825 A | | 10/1998 | Corrigan et al. |
| 5,831,690 A | | 11/1998 | Lyons et al. |
| 5,862,451 A | | 1/1999 | Grau et al. |
| 5,867,528 A | | 2/1999 | Verbueken |
| 5,896,414 A | | 4/1999 | Meyer et al. |
| 5,903,558 A | | 5/1999 | Jones et al. |
| 5,909,384 A | | 6/1999 | Tal et al. |
| 5,937,005 A | | 8/1999 | Obuchi et al. |

(Continued)

OTHER PUBLICATIONS

Data–Over–Cable Service Interface Specifications, Radio Frequency Interface Specification, SP–RFI–105–991105, Nov. 5, 1999, pp i–202.*
Data–Over–Cable Service Interface Specifications, Radio Frequency Interface Specification, SP–RFIv1.1–I03–991105, Nov. 5, 1999, pp i–366.*
Data–Over–Cable Service Interface Specifications, Baseline Privacy Interface Specification, SP–BPI–102–990319 (Mar. 19, 1999), pp. i–88.
Data–Over–Cable Service Interface Specifications, Baseline Privacy Interface Specification, SP–BPI–102–990731 (Jul. 31, 1999) pp. i–160.
Data–Over–Cable Service Interface Specifications, Radio Frequency Interface Specification, SP–RFIv1.1–I03–991105 (Nov. 5, 1999) pp. i–366.
Data–Over–Cable Service Interface Specifications, Operations Support System Interface Specification SP–OSSIv1.1–D01–991115 (Nov. 15, 1999) pp. i–81.
Data–Over–Cable Service Interface Specifications, Operations Support System Interface Specification SP–OSSIv1.1–I03–001220 (Dec. 20, 2000) p. ii.

*Primary Examiner*—Wellington Chin
*Assistant Examiner*—John Shew
(74) *Attorney, Agent, or Firm*—John W. Carpenter; Reed Smith LLP

(57) ABSTRACT

A two dimensional scheduler integrates the allocation of both the time domain and the channel domain for upstream communication in a broadband wireless access system. This allows for the optimization of system resource usage and allows for dynamic switching between a number of different upstream channels by a modem. Modems are calibrated via a calibration message constructed at the hub by measuring some parameters of communication bursts between the modem to the hub. The modems rotate in using the available upstream channels so that each available channel is fully calibrated using actual communication bursts, keeping the parameters for each channel ready for use when assigned for communicating on any of the available channels.

22 Claims, 5 Drawing Sheets

U.S. PATENT DOCUMENTS

| | | |
|---|---|---|
| 5,940,743 A | 8/1999 | Sunay et al. |
| 5,963,843 A | 10/1999 | Sit et al. |
| 5,963,870 A | 10/1999 | Chheda et al. |
| 5,974,106 A | 10/1999 | Dupont |
| 5,978,855 A | 11/1999 | Metz et al. |
| 5,991,286 A | 11/1999 | Labonte et al. |
| 6,009,310 A | 12/1999 | Motohashi |
| 6,035,008 A | 3/2000 | Kim |
| 6,052,408 A | 4/2000 | Trompower et al. |
| 6,072,839 A | 6/2000 | Mondal et al. |
| 6,075,787 A | 6/2000 | Bobeck et al. |
| 6,111,887 A | 8/2000 | Daily et al. |
| 6,112,232 A | 8/2000 | Shahar et al. |
| 6,128,588 A | 10/2000 | Chacon |
| 6,140,911 A | 10/2000 | Fisher et al. |
| 6,141,356 A | 10/2000 | Gorman |
| 6,157,311 A | 12/2000 | Berkovich |
| 6,160,447 A | 12/2000 | Huang |
| 6,172,970 B1 | 1/2001 | Ling et al. |
| 6,185,227 B1 | 2/2001 | Sipola |
| 6,195,697 B1 | 2/2001 | Bowman-Amuah |
| 6,611,868 B1 * | 8/2003 | Arutyunov .................. 709/227 |
| 6,650,451 B1 * | 11/2003 | Byers et al. ................. 398/129 |
| 2001/0055319 A1 * | 12/2001 | Quigley et al. ............. 370/480 |

* cited by examiner

TWO-DIMENSIONAL SCHEDULING SCHEME FOR A BROADBAND WIRELESS ACCESS SYSTEM

CROSS REFERENCE TO RELATED APPLICATION AND CLAIM OF PRIORITY

This invention claims priority to the following co-pending U.S. provisional patent applications, which are incorporated herein by reference, in their entirety:

Jonas et al, Provisional Application Ser. No. 60/178,138, entitled "Two-Dimensional Scheduling Scheme for Broadband Wireless Access System," filed 26 Jan. 2000 and Provisional Application Ser. No. 60/187,568 filed 7 Mar. 2000.

BACKGROUND OF THE INVENTION

1. Field of Invention

The present invention relates to broadband wireless access systems, and amongst other things to a method of dynamically scheduling multiple upstream channel transmission in a broadband wireless access system.

2. Discussion of Background

Point to multi-point fixed broadband wireless access systems over MMDS networks are known in broadcast situations. These networks operate over licensed bands including the MMDS band (2,150 to 2,162 MHz), the WCS band (2,305 to 2,360 MHz) and the ITFS/MMDS bands (2,500 to 2,686 MHz).

A known cable based broadband access system, which operates at a range of between 50 MHz and 864 MHz, but not in the MMDS, WCS, or ITFS/MMDS bands, is the data over cable specification system, which is specified in the data over cable system interface specifications (DOCSIS). An overview of the cable based DOCSIS system is depicted in FIG. 1. A CMTS 10 communicates with a wide area network 20, such as the internet. The CMTS 10 can transmit signals from the wide area network 20 along a cable network 30 through cable modems 40 to CPE 50 (Customer Premise Equipment—intended throughout this document to include a computer and/or all of the equipment at the customer site, such as a LAN—Local Area Network). CPE 50 messages can be transmitted to the wide area network 20 through the cable modem 40 along the cable network 30 to the CMTS 10.

In point to multi-point broadband access systems one central end-point, i.e. the head-end, communicates through a bi-directional link or links with multiple end-points, i.e. the nodes. The number of nodes in communication varies in time and can be none, one or two or more at any specific time.

The link(s) between the head-end and the nodes are combined in one or more channels. The signal path from the central end-point to the nodes is referred to as downstream, while the signal path from the nodes to the central end-point is referred to as upstream.

A single channel can be used to deliver information from a node to the head-end, and the downstream is used from the head-end to a node or a group of nodes. On any single upstream channel used for communication from the nodes(s) to the central point, then only one end-point can successfully send information on the single upstream channel at any one time.

If multiple upstream channels are utilized for communication from the nodes(s) to the central point the upstream channels need to be differentiated from one another to prevent interference. Examples of differentiation methods include FDMA, different sub-channels of OFDM, transmission of different polarity or direction of the node antennas, and different subnets in a CATV network.

To successfully utilize several upstream channels, it is required that no two nodes transmit on the same upstream channel during the same time period, e.g. time slot in a TDMA type scheme. Therefore, a coordination method is required that will allocate to each node a separate channel and/or time interval to prevent interference.

The performance characteristics, including such factors as capacity and error rate, can be different for each upstream channel and for each node that is using the upstream channel. These performance characteristics generally vary over time, due to environmental conditions. Examples of specific causes of the variations are multi-path fading or external interference, which are both frequency dependent. Different channels can use different parameters, such as modulation scheme and symbol rate, to support more robustness or higher information rate.

A known upstream channel allocation scheme is defined in DOCSIS. These specifications refer to the case of HFC network. In the DOCSIS system, each upstream channel is assigned a different frequency range. Different channels are used for upstream or downstream directions.

In the DOCSIS scheme there is no need to coordinate the downstream channel, since only the head-end is transmitting in this direction. Further in DOCSIS, the head-end is responsible for the allocation of the upstream channels. These allocations are performed in two general steps, one for the allocation of an upstream channel and the other for the allocation of time intervals in the upstream channels.

The head-end periodically transmits information regarding available upstream channels and their parameters on the downstream channel. This information is used during the registration process by the modem to select an upstream channel. Also, the head-end can command a node to change its upstream channel. Changing of an upstream channel is a long procedure, which may take a long period of time, while the service is interrupted. Hence, a node normally maintains the same upstream channel for a long period of time or even the length of its entire communication scheme.

The allocation of the time intervals on each upstream channel is also performed by the head-end. The head-end transmits the time interval allocations on the downstream channel in a message called MAP. A single MAP message describes time interval allocation on a single upstream channel for a specific period of time.

The DOCSIS solution uses a fixed upstream channel for each node, which implies that statistical changes to the traffic load may cause a high load on one channel, while not allowing other channels with lower loads to be used to balance higher load channel. Further, if the performance of the current upstream channel of a node becomes unacceptable, e.g. falls below predetermined threshold levels, the node must switch to an alternate channel. This switching process, which includes a search for the best available channel, takes a longtime during which service to the node is interrupted.

It is desired to make the upstream channel allocations in such a way that will utilize as much of the upstream channel capacity as possible. Further, it is desired that should communication with each node on an upstream channel is maintained as having as high of performance capabilities as possible. Additionally, when multiple services are supported by the broadband access system, some Quality of Service (QoS) requirements need to be defined which add additional limitations on any allocation scheme. Such limitations can include the committed information rate for each node.

SUMMARY OF THE INVENTION

In one embodiment, the present invention provides for a method for scheduling that integrates the allocation of both the time domain and the channel domain to a wireless modem for upstream communication in a broadband wireless access system. This allows for the optimization of system resource usage and allows for dynamic switching between a number of different upstream channels by the modem.

In another embodiment, the present invention provides for a method for scheduling upstream channel transmission by a wireless modem in communication with a wireless hub in a broadband wireless access system. The method comprises synchronizing the wireless modem with the wireless hub on a downstream channel, receiving at the wireless modem a message comprising information regarding the parameters for communicating over each of a plurality of upstream channels, utilizing one upstream channel of the plurality of upstream channels, transmitting from the wireless hub to the wireless modem a message regarding a change to some of the parameters for communicating over some of a plurality of upstream channels, and utilizing another upstream channel of the plurality of upstream channels to communicate from the wireless modem to the wireless hub.

In another embodiment, the present invention provides for a method for calibration of upstream parameters by combination of using the transmitted data and special messages for modems that are not transmitting data.

The present invention may be embodied as a method for scheduling upstream channel transmission by a wireless modem of a plurality of wireless modems in communication with a wireless hub in a broadband wireless access system, comprising, synchronizing the wireless modem with a wireless hub on a downstream channel by synchronizing the symbol timing, forward error correction framing, and recognition of a synchronization message at the wireless modem, receiving at the wireless modem on the downstream channel at least one message comprising information regarding parameters for communicating over each of a plurality of upstream channels, utilizing one upstream channel of the plurality of upstream channels to communicate from the wireless modem to the wireless hub for one burst, transmitting from the wireless hub to the wireless modem on the downstream channel at least one message regarding a change to some of the parameters for communicating over at least some of the plurality of upstream channels, and utilizing another upstream channel of the plurality of upstream channels for another burst to communicate from the wireless modem to the wireless hub based upon the change to some of the parameters for communicating over each of the plurality of upstream channels.

The present invention includes a method of calibrating a modem in a communication system, comprising the steps of, measuring parameters of messages received by a hub communicating with said modem, sending a correction message from the hub to the modem, and changing the parameters at the modem. In addition the invention may be embodied as a device having parts configured to perform each step of the above described methods.

Both the device and method may be conveniently implemented on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
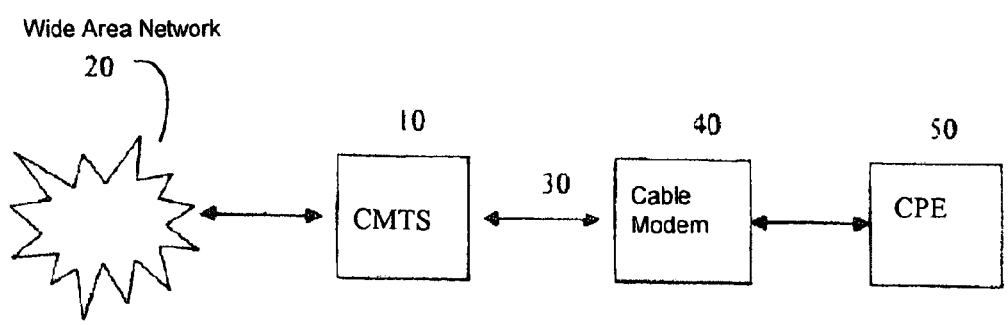
FIG. 1 is an overview of a known data over cable system.
Figure 2:
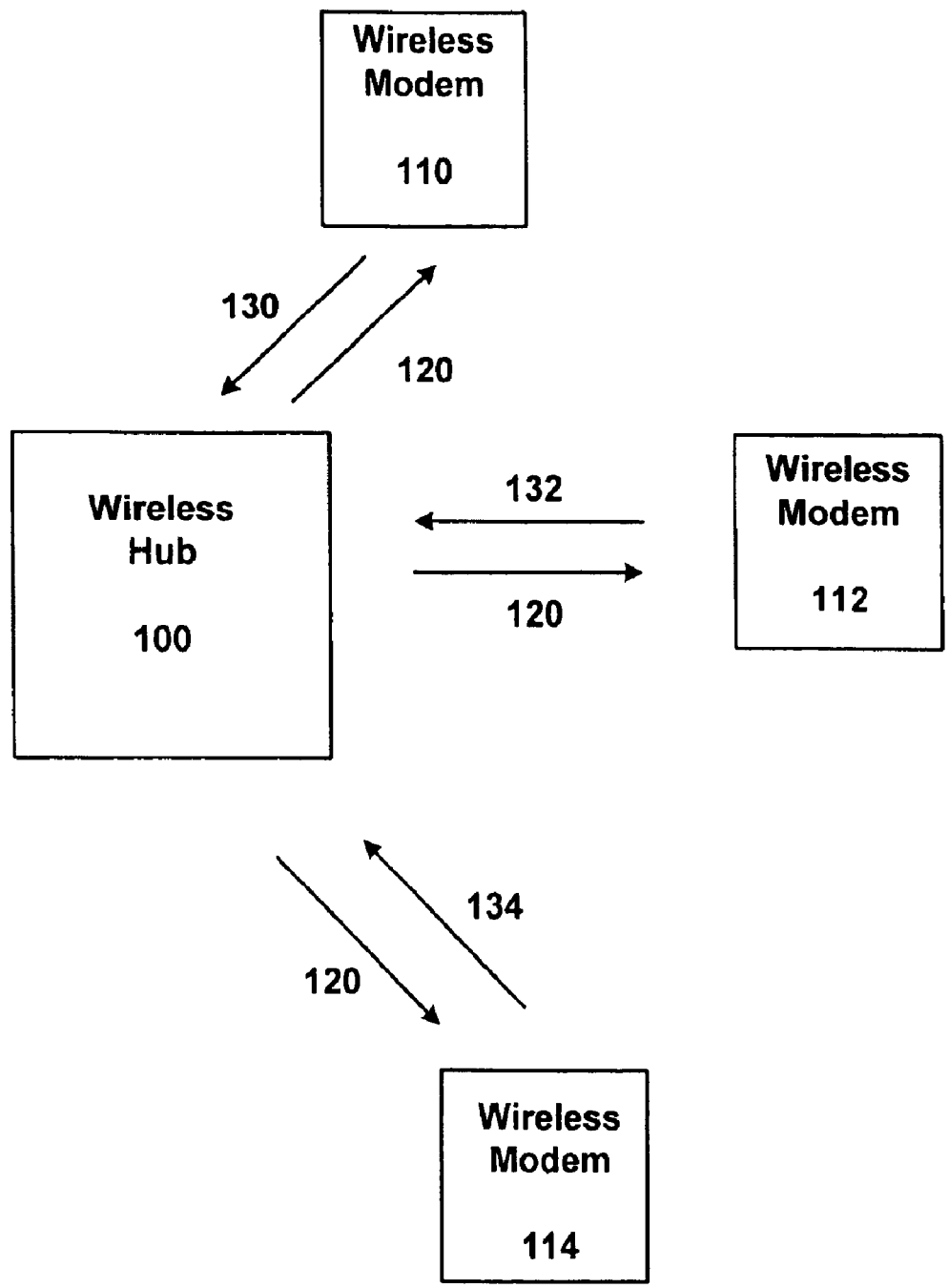
FIG. 2 is a block diagram of a wireless hub communicating with a plurality of wireless modems in a broadband wireless access system according to a presently preferred embodiment of the present invention.

Referring again to the drawings, wherein like reference numerals designate identical or corresponding parts, and more particularly to FIG. 2 thereof, there is illustrated a presently preferred embodiment of the present invention, including a wireless hub 100 that communicates with a number of wireless modems 110, 112 and 114 on a downstream channel 120 and upstream channels 130, 132 and 134 respectively. The wireless hub, by determining the load and RF performance characteristics of each upstream channel 130, 132 and 134, can assign any of the wireless modems 110, 112 or 114, on its next burst, to another upstream channel. The newly assigned upstream channel is one of a group of upstream channels assigned by the wireless hub to the wireless modem 110, 112 or 114. This can be an assignment of one of the wireless modems to a same upstream channel as another wireless modem, e.g. assigning wireless modem 110 to upstream channel 132, or assignment to a completely different upstream channel, e.g. assigning wireless modem 112 to upstream channel 136 (not shown).

The scheduler, which is presently preferred to be referred to as a two dimensional scheduler, integrates the allocation of both the time domain and the channel domain. This combined approach enables optimization of system resource usage, while also optimizing for the RF capabilities of each modem.

The wireless hub monitors the alterable parameters of the wireless modem, such as power, frequency offset, timing and delay. This enables the wireless hub to quickly instruct the wireless modem to switch to another upstream channel, if and when, an upstream channel in current use becomes unavailable or suffers from a degradation of performance.

Referring to FIG. 2, when a wireless modem connects to the network, it will preferably be assigned by the wireless hub to a group of channels that can be used as the upstream channel by that modem. The wireless hub will supply to the nodes all the required parameters, which are needed to communicate over each of the upstream channels in the group. If necessary, that information can be altered during a connection period, based upon any dynamic changes sensed by the wireless hub. The wireless hub continuously assigns resources of each channel group to the modems assigned to the group. The list of allocations is delivered on the downstream channel in messages, which describe, for each allocation, both the time interval and the channel to be used.

Each node will be able to switch to a different upstream channel in the group between successive transmissions by that node. If there is a minimum switching time that is required by a modem, it will be known at the wireless hub. This can be configured into the hub or can be delivered through the network. The wireless hub will take this minimum switching time into account when making the allocations.

In addition, the wireless hub monitors the received information on the upstream channel. It employs this information to instruct the modem to correct the ranging parameters. Examples of such parameters are symbol rate and modulation scheme, e.g. QPSK or QAM. This continuous monitoring and parameter correction is done with respect to all the upstream channels in the group to enable the continuous and accurate usage of those channels. The channel monitoring operation enables the wireless hub to follow the performance of each modem on each channel. This information can be used to optimize the allocations, such that a modem will get more allocations on channels where its performance is higher.

It is also preferred that different channels will typically use different parameters as a tradeoff between throughput and robustness. Modems with transmission paths having transmission problems, resulting in high error rates problems, and therefore cannot use the higher throughput channels, will be allocated a lower throughput but more robust channel. Modems that are providing adequate information rates will be able to use both the high throughput and the lower throughput channels, according to the available resources of those channels.

A specific implementation of the above described, which is described below, scheme is based on the Data-Over-Cable Service Interface Specifications (DOCSIS) of the Cable Television Laboratories Inc, which are incorporated herein by reference in their entirety as if fully set forth herein. The DOCSIS specifications refer to the case where the transmission medium is a HFC network. However, the PHY that is defined in these specifications can be modified to support wireless networks.

The following are the changes to DOCSIS protocol and message content and format that are required to implement the scheme:

A wireless hub will be assigned a group of channels rather than a single channel as in DOCSIS. The Upstream Channel Descriptor (UCD) and Upstream Channel Change (UCC) MAC management messages will be changed to define this group of channels.

The DOCSIS MAP format will be changed in such a way that it will define, for each allocation, both the time period and the upstream channel for each modem to use. A modem utilized in this scheme will therefore be capable of decoding all of the MAP messages for its channel group and use any allocation in it.

A modem should be capable to transmit each packet on a different channel, according to the channel that has been assigned in the MAP message. The wireless hub will assure a minimum required interval between consecutive allocations on different channels for the same modem. This interval should be configured in or otherwise maintained by the wireless hub.

After acquiring a downstream channel, a modem will receive information regarding a group of upstream channels. The group of upstream channels will be defined in the UCD message. The modem will first perform ranging on a single channel from this group, as described in DOCSIS. After successfully ranging on the single channel, the modem will transmit on this single upstream channel, while continuing to range the other channels in the group when it is not transmitting on the single upstream channel. The wireless hub will allocate a modem, for purposes other than ranging, only on channels where it has completed the ranging process. This procedure enables fast initialization with the capability for subsequent connections to all the channels in the channels group.

A presently preferred two dimensional MAP message, MAP2D, which replaces the DOCSIS MAP message to support two dimensional, channel and time, allocation is described below. Alternatively, the DOCSIS MAP format may be used if a single channel is being used. A MAP that complies with DOCSIS is indicated by a version 1 identity, while the MAP2D message herein is indicated by the version 129 identity.

For an upstream channel group with more than one channel, a Base Station Indoor Unit (BS IDU) generates MAP2Ds in the format shown in Table 1 below.

TABLE 1

| MAP2D Message Description | | | |
|---|---|---|---|
| Bit 0 | 8 | 16 | 24 |
| | | | 31 |
| Mac Management Message Header | | | |
| Upstream Channel Group ID | UCD Count | Number of elements | Reserved |
| Alloc Start Time | | | |
| Ack Time | | | |
| Ranging Backoff Start | Ranging Backoff End | Data Backoff Start | Data Backoff End |
| Map Information Elements | | | |

The parameters of Table 1 are identified in Table 2 below as follows:

TABLE 2

| MAP Information Element Structure | |
|---|---|
| Upstream Channel Group ID | The identifier of the upstream channel group to which this message refers. |
| UCD Count | Matches the value of the Configuration Change Count of the UCD, which describes the burst parameters which apply to this map. See Section 9.3.2. |
| Number Elements | Number of information elements in the map. |
| Reserved | Reserved field utilized for alignment. |
| Alloc Start Time | Effective start time from BS IDU initialization (in mini-slots) for assignments within this map. |
| Ack Time | Latest time, from BS IDU initialization, (mini-slots) processed in upstream. This time is used by the CPE IDUs for collision detection purposes. See Section 7.4. |
| Ranging Backoff Start | Initial back-off window for initial ranging contention, expressed as a power of two. Values range 0–15 (the highest order bits must be unused and set to 0). |
| Ranging Backoff End | Final back-off window for initial ranging contention. This is expressed as a power of two. Values range 0–15 (the highest order bits must be unused and set to 0). |
| Data Backoff Start | Initial back-off window for contention data and requests, expressed as a power of two. Values range 0–15 (the highest order bits must be unused and set to 0). |

TABLE 2-continued

MAP Information Element Structure

| | |
|---|---|
| Data Backoff End | Final back-off window for contention data and requests. This is expressed as a power of two. Values range 0–15 (the highest order bits must be unused and set to 0). |
| MAP Information Elements | Values for IUCs are defined in Table 6-20 in DOCSIS RFIv1.1 and are described in detail in Section 7.1.2 of DOCSIS RFIv1.1. Changes to the definitions in DOCSIS are followed. |

It should be noted that, that the lower (26–M) bits of the Alloc Start Time and Ack Time are used as the effective MAP start and Ack times where M is given in Section 6.3.3 of DOCSIS RFIv1.1. The relationship between the Alloc Start/Ack time counters and the timestamp counter is described in Section 7.4 of DOCSIS RFIv1.1.

TABLE 3

MAP Information Element Structure

| Bit | 0<br>13 | 14<br>17 | 18<br>31 |
|---|---|---|---|
| | Channel ID | IUC = 14 | Offset = Initial offset for first channel |
| First Interval | SID | IUC | Offset |
| Second Interval | SID | IUC | Offset |
| . | | | |
| Last Interval of first channel | SID | IUC | Offset |
| End of list for first channel | SID = 0 | IUC = 7 | Offset = End of last allocation + 1 |
| | Channel ID | IUC = 14 | Offset = Initial offset for second channel |
| First Interval of second channel | SID | IUC | Offset |
| . | | | |
| Last Interval of second channel | SID | IUC | Offset |
| End of list for second channel | SID = 0 | IUC = 7 | Offset = End of last allocation + 1 |
| . | | | |
| End of list for last channel | SID = 0 | IUC = 7 | Offset = End of last allocation + 1 |
| | SID | IUC | Offset = Don't care |
| Acknowledgements and Data Grants Pending | . | | |
| | SID | IUC | Offset = Don't care |

The allocation MAP Information Elements (IE) are the same as specified in the DOCSIS RFI specification, except for the following changes. First, the MAP2D may contain allocation instructions for a number of channels of the same channel group. Second, an additional element is added to indicate the upstream channel to be used for subsequent allocations. Third, there is no requirement for the allocations for all the channels to start at the same mini-slot. Hence, a starting offset is added to indicate the start of first allocation of this channel, relative to the Alloc start time.

TABLE 4

| IE Name | Interval Usage Code (IUC) (4 bits) | SID (14 bits) | Mini-slot Offset (14 bits) |
|---|---|---|---|
| Channel Indicator | 14 | Upstream Channel ID | Starting Offset for this channel |

The Null IE is used to terminate each one of the channels, see Table 4 above. Its offset size refers to the ending offset of the previous allocation and it is not necessarily the same as the map length.

Acknowledgement and data grants pending are delivered at the end of all the channel allocations. Since the map length may be different for each channel, there is no meaning to this value which is defined in DOCSIS. In this standard, the offset for this IEs is unused and may be set by the BS IDU to any desired value.

Figure 3:
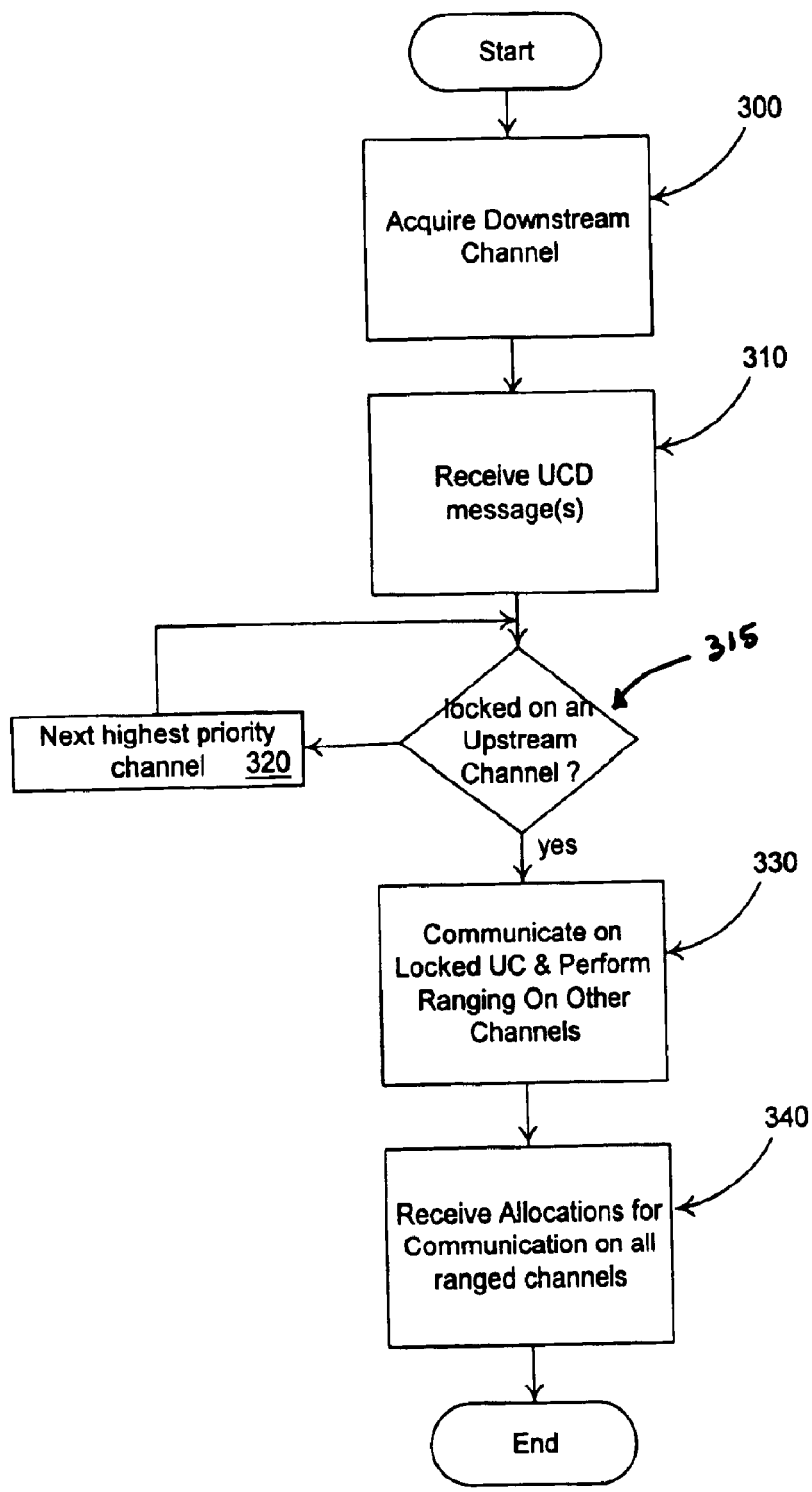
FIG. 3 is a flow chart of a process for acquiring and allocating a plurality of upstream channels according to the present invention.

A preferred embodiment of the wireless modem initialization procedure utilizing the functions of the present invention comprises (referring to FIG. 3):

1. Acquiring a downstream channel (step 300, see DOCSIS, for example)
   1.1 Scanning to find a downstream channel.
   1.2 Lock onto modulation symbols.
   1.3 Locking onto FEC frames.
   1.4 Locking onto MPEG-2 frames.
   1.5 Receiving SYNC message to acquire the system time reference.
2. Acquiring an upstream channel (steps 310–320)
   2.1 Receiving the UCD message from the downstream channel (step 310). This message defines the upstream channels group with all the needed parameters to use the channels.
   2.2 Waiting for a MAP message that includes an allocation for initial ranging. This message includes an indication to the channel, which should be used for the initial ranging.
   2.3 Sending a Ranging Request Message (RNG-REQ) at the time and on the channel that were defined in the MAP message.
   2.4 Get Ranging Response Message (RNG-RSP). This message may contain corrections to the wireless modem's parameters such as frequency offset, power level or timing. If at this point there are no corrections, skip to step 4. If there are corrections create them and send again RNG-REQ message on the next allocated channel and timing.
3. Configuration and Registration (same as DOCSIS).
   3.1 Acquiring IP parameters, using DHCP.
   3.2 Acquiring Time Of Day from the time server.
   3.3 Download configuration file from TFTP server.
   3.4 Send Registration Request (REG-REQ)
   3.5 Get Registration Response (REG-RSP)
   3.6 Send Registration Acknowledgement (REG-ACK)
4. Acquiring the other channels of the channels group After the initialization, the modem continues to acquire the other channels in its channels group (step 330). This process is done on the background, while the modem can transmit data in the acquired channels. Acquiring of the other channels is done as the same way of the first one (steps 2.2–2.4).

The wireless hub should give allocations for data, only on the acquired channels (step 340). This procedure enables fast starting with gradual connection to all the channels in the channels group. It should be noted that all the upstream transmissions use the same allocation types as in DOCSIS. The allocations here also include the additional parameters of the upstream channel, which must be used by the modem.

The scheduler implementation will be based on any scheduler that can be used with a DOCSIS system, with the following modifications:

1. The available mini-slots to be used for allocations are all the mini-slots on all the upstream channels within a channels group. The wireless hub can assign bandwidth for the wireless modem on any upstream channel on a per burst basis.

2. Each modem should be assigned a priority for each channel. The priority is based on the performance of the modem on each channel and the load on the channel. These priorities can be dynamically changed.

3. Allocations for modems will be done according to these priorities. This way, a modem with low information rates or high error rates on one channel will get its allocations on other channels which will be with higher priority for that modem. Modem with high performance on all the channels will get most of its allocations on the less loaded channel.

4. A minimum allocation rate will be assigned for each modem on each channel, even those with low priority. This assures that the information on the performance and parameters on each channel per each modem is updated (see step 530, for example).

5. Periodic calibration of upstream parameters (one or multiple channels)

Figure 4:
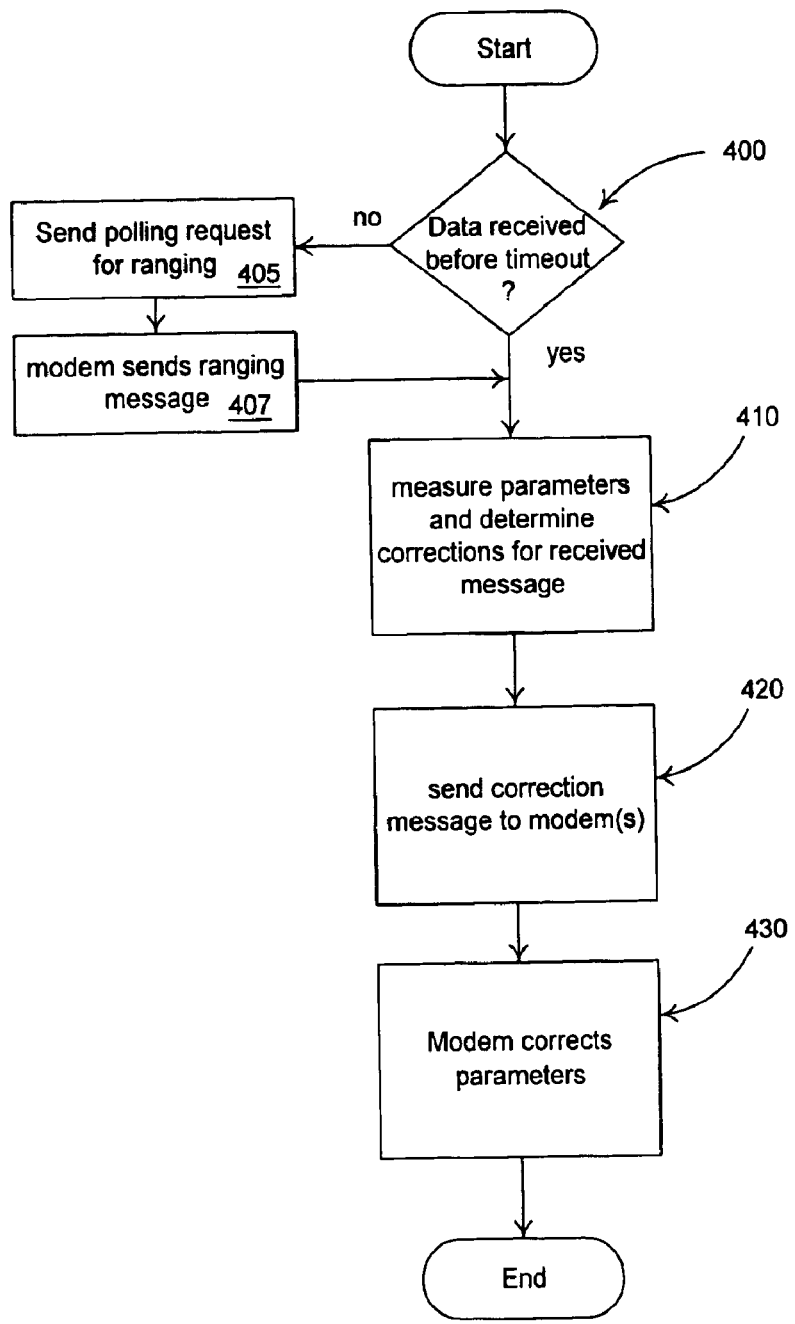
FIG. 4 is a flow chart of a calibration procedure according to the present invention.

Periodic calibration of upstream operational parameters like power, timing, frequency offset and equalizer coefficients is required to be done in the point-to-multipoint BWA systems. Calibration is required to be updated from time to time. Referring now to FIG. 4, calibration of upstream parameters involves measurement of the received parameters by the hub, building a correction message, sending the correction message from the hub to the modem, and correction of the parameters by the modem.

The periodic calibration is typically done, as in DOCSIS, by periodically special purpose transmissions from the modems to the hub. These messages are used by the hub to measure the parameters and then it returns a message with the needed corrections.

According to this invention, the calibration of all the modems is done in two ways:

The active modems can be calibrated by measuring the parameters of the received data.

The non-active modems will do calibration by polling as defined in the DOCSIS specification. Since these modem are not active, a lower rate may be used.

Referring now to FIG. 4, the hub waits for a received data message (step 400). If not received, the hub sends polling request for ranging the inactive modem (step 405), and the inactive modem responds with a ranging message (step 407). With either a received data message or a received ranging message, the hub then measures parameters of the received message and calculates correction parameters (step 410), sends the correction parameters to the modem (step 420), and the modem applies the correction parameters (step 430).

With multiple channels, as described in this patent, the system is required to keep track of the parameters of all the channels. This will cause a large overhead with the DOCSIS polling method. To resolve this, in two dimensional scheduling, allocations are made in such way that modems get allocations in all the channels. There will be at least one allocation for each channel as per pre-configured interval. This way the active modems will be calibrated by measurement of the received data parameters.

Figure 5:
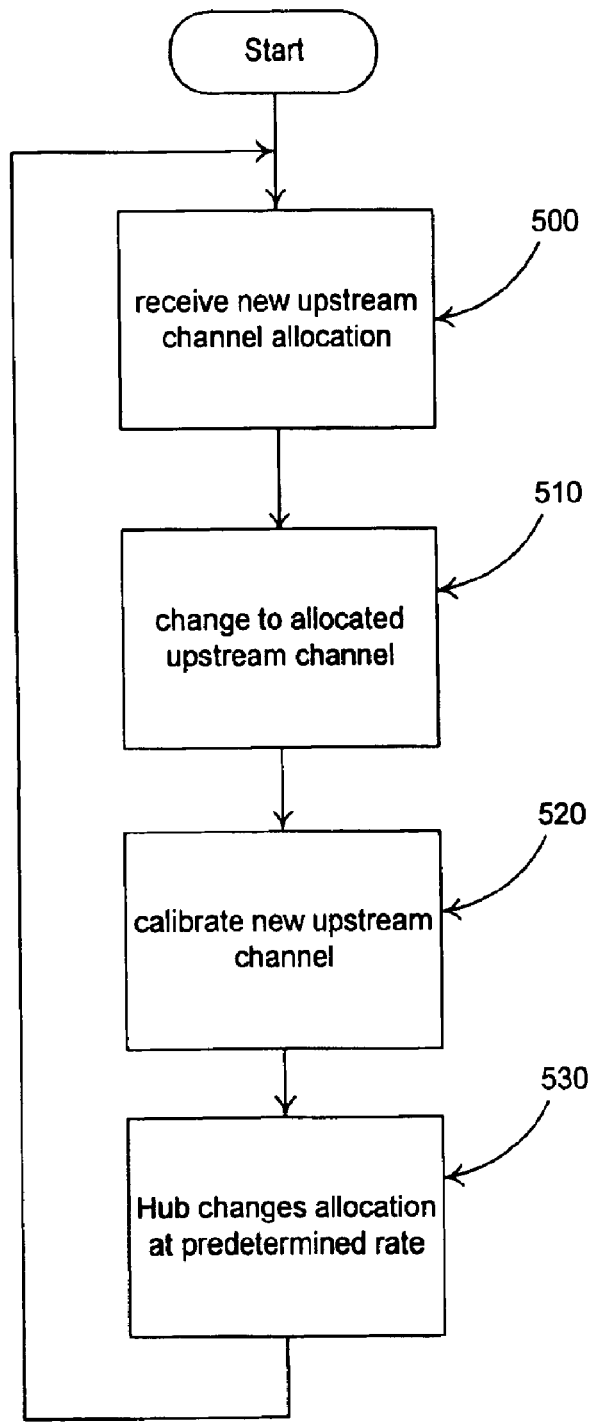
FIG. 5 is a flow chart of a multi-channel calibration procedure according to the present invention.

A minimum allocation rate will be assigned for each modem on each channel, even those with low priority. This assures that the information on the performance and parameters on each channel per each modem is updated. If a modem is not transmitting enough data to assure the minimal allocation on all the channel, then special messages (as in DOCSIS) will be transmitted by the modem to achieve the minimum rate. Referring to FIG. 5, the process may be embodied in the steps of receiving an upstream channel allocation(s) from the hub (step 500); changing, by the modem, of the upstream channel (step 510); calibrating the new upstream channel (see FIG. 4, for example) (step 520); and, at the predetermined interval, changing the upstream allocation by the hub (step 530).

While the embodiments, applications and advantages of the present invention have been depicted and described, there are many more embodiments, applications and advantages possible without deviating from the spirit of the inventive concepts described and depicted herein. The invention should only be restricted in accordance with the spirit of the claims appended hereto and is not restricted by the preferred embodiments, specification or drawings.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, synchronizing communication between a modem and hub, calculating calibrating parameters of received transmissions, sending calibration messages on downstream channels, calibrating modems based received calibration messages, selecting upstream channels based on channel and mini-slot allocations, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A method for scheduling upstream channel transmission by a wireless modem of a plurality of wireless modems in communication with a wireless hub in a broadband wireless access system, comprising:

synchronizing the wireless modem with a wireless hub on a downstream channel by synchronizing the symbol timing, forward error correcting framing, and recognition of a synchronization message at the wireless modem;

receiving at the wireless modem on the downstream channel at least one message comprising information regarding parameters for communicating over each of a plurality of upstream channels;

utilizing one upstream channel of the plurality of upstream channels to communicate from the wireless modem to the wireless hub for one burst;

transmitting from the wireless hub to the wireless modem on the downstream channel at least one message regarding a change to some of the parameters for communicating over at least some of the plurality of upstream channels;

utilizing another upstream channel of the plurality of upstream channels for another burst to communicate from the wireless modem to the wireless hub based upon the change to some of the parameters for communicating over each of the plurality of upstream channels, allocating each of said plurality of upstream channels to different of said plurality of wireless modems for communication bursts on a predetermined schedule; and calibrating parameters of each of the plurality of upstream channels for each of the modems using the communication bursts between each respective modem and the wireless hub;

wherein said step of allocating comprises the step of sending a special message to communicate with a modem and cause a communication burst if the modem is not communicating with said hub at a rate sufficient to meet the minimum allocation rate assigned to the modem.

2. The method of claim 1, wherein the step of utilizing one upstream channel of the plurality of upstream channels comprises utilizing the one upstream channel based upon an assignment to the one upstream channel in the message comprising information regarding the parameters for communicating over each of the plurality of upstream channels.

3. The method of claim 1, wherein the step of utilizing one upstream channel of the plurality of upstream channels comprises utilizing the one upstream channel based upon a selection of the one upstream channel at the wireless modem based upon the message comprising information regarding the parameters for communicating over each of a plurality of upstream channels.

4. The method of claim 3, wherein message comprising information regarding the parameters for communicating over each of a plurality of upstream channels includes a priority parameter, the step of utilizing the one upstream channel based upon the selection of the one upstream channel at the wireless modem comprises making the selection based upon a priority value.

5. The method of claim 1 wherein the wireless modem communicates utilizing the one upstream channel and the another upstream channel based upon instructions contained in the at least one message comprising information regarding the parameters for communicating over each of the plurality of upstream channels.

6. The method of claim 1 wherein the parameters comprise at least one of signal power, frequency and timing.

7. The method according to claim 1, wherein:

said step of utilizing another upstream channel comprises utilizing at least one other upstream channel of the plurality of upstream channels or other communication bursts from the wireless modem to the wireless hub; and switching between the one upstream channel and the other upstream channels based on the parameters for communicating over each of the plurality of upstream channels.

8. The method according to claim 7, wherein said parameters include a channel identification and a mini-slot designation for each communication burst.

9. The method according to claim 1, further comprising the step of calibrating parameters of the plurality of upstream channels.

10. The method according to claim 9, wherein said parameters include at least one of power, timing, frequency offset, and equalizer coefficients.

11. The method according to claim 9, wherein said step of calibrating comprises the steps of:

measuring the parameters received by the hub;

sending a correction message from the hub to the modem; and changing the parameters at the modem.

12. A method of calibrating a modem in a communication system, comprising the steps of:

measuring parameters of messages received by a hub communicating with said modem;

sending a correction message from the hub to the modem; and changing the parameters at the modem;

wherein said step of sending comprises the step of sending special message to communicate with a modem and cause a communication burst if the modem is not communicating with said hub at a rate sufficient to meet the minimum allocation rate assigned to the modem.

13. The method according to claim 12, wherein aid parameters include at least one of power, timing, frequency offset, and equalizer coefficients.

14. The method according to claim 12, wherein said modem and said hub are part of a broadband wireless access system.

15. The method according to claim 12, wherein:

a modem currently communicating with said hub is calibrated by measuring the parameters of data received; and a modem currently idle is calibrated using a polling scheme.

16. The method according to claim 15, wherein said polling scheme is performed at a lower data rate than other communication with said hub.

17. The method according to claim 15, wherein said polling scheme is performed at times when a channel on which the polling is performed is free of other traffic.

18. The method according to claim 8, further comprising the steps of:
    allocating each of said plurality of upstream channels to different of said plurality of wireless modems for communication bursts on a predetermined schedule; and
    calibrating parameters of each of the plurality of upstream channels for each of the modems using the communication bursts between each respective modem and the wireless hub.

19. The method according to claim 18, wherein said parameters include at least one of power, timing, frequency offset, and equalizer coefficients.

20. The method according to claim 19, wherein said predetermined schedule is a minimum allocation rate assigned to each modem.

21. A method according for scheduling upstream channel transmission by a wireless modem of plurality of wireless modems in communication with a wireless hub in a broadband wireless access system, comprising:
    synchronizing the wireless modem with a wireless hub on a downstream channel by synchronizing the symbol timing, forward error correction framing, and recognition of a synchronization message at the wireless modem;
    receiving at the wireless modem on the downstream channel at least one message comprising information regarding parameters for communicating over each of a plurality of upstream channels;
    utilizing one upstream channel of the plurality of upstream channels to communicate from the wireless modem to the wireless hub for one burst;
    transmitting from the wireless hub to the wireless modem on the downstream channel at least one message regarding a change to some of the parameters for communicating over at least some of the plurality of upstream channels;
    utilizing another upstream channel of the plurality of upstream channels for another burst to communicate from the wireless modem to the wireless hub based upon the change to some of the parameters for communicating over each of the plurality of upstream channels,
    allocating each of said plurality of upstream channels to different of said plurality of wireless modems for communication bursts on a predetermined schedule; and
    calibrating parameters of each of the plurality of upstream channels for each of the modems using the communication bursts between each respective modem and the wireless hub,
    wherein:
    said step of utilizing another upstream channel comprises utilizing at least one other upstream channel of the plurality of upstream channels for other communication bursts from the wireless modem to the wireless hub;
    switching between the one upstream channel and the other upstream channels based on the parameters for communicating over each of the plurality of upstream channels;
    said parameters include a channel identification and a mini-slot designation for each communication burst;
    said parameters include at least one of power, timing, frequency offset, and equalizer coefficients;
    said predetermined schedule is a minimum allocation rate assigned to each modem; and
    said step of allocating comprises the step of sending a special message to communicate with a modem and cause a communication burst if the modem is not communicating with said hub at a rate sufficient to meet the minimum allocation rate assigned to the modem.

22. The method according to claim 1, wherein said modems and said hub are at least part of a broadband wireless access system.

* * * * *